United States Patent Office 2,882,264
Patented Apr. 14, 1959

2,882,264

POLYMERIZATION OF ETHYLENE

Earle B. Barnes, Freeport, John E. Thomson and George A. Klumb, Jr., Lake Jackson, Tex., assignors to The Dow Chemical Company, Midland, Mich., a corporation of Delaware No Drawing. Application October 10, 1955
Serial No. 539,674

15 Claims. (Cl. 260—94.9)

This invention relates to the polymerization of normally gaseous alpha-olefins, such as ethylene. It especially pertains to improvements in polymerization of ethylene in contact with certain organo-metal complex catalysts.

Recent developments in the making of polymers such as polyethylene have involved the use of complex organo-metal catalysts, whereby high molecular weight products can be obtained at relatively low pressures, e.g. pressures below 100 atmospheres, and at relatively low temperatures, e.g. from 50° to 100° C. The solid polymer products thereby obtained have high molecular weights, e.g. from 50,000 to 300,000 or more, softening points in the order of 130° C. and above, and densities in the order of 0.94 and above. The complex organo-metal catalysts that are employed to effect such polymerizations are formed, for example, by admixing a trialkyl aluminum compound and a compound of a heavier metal of group IV–B, V–B, or VI–B of the periodic system of the elements. The trialkyl aluminum compound may be trimethyl aluminum, triethyl aluminum, tripropyl aluminum, triisobutyl aluminum, and similar trialkyl aluminum compounds, and mixtures of trialkyl aluminum compounds. The group IV–B, V–B, and VI–B heavier metal compounds referred to may be compounds of titanium, zirconium, hafnium, thorium, vanadium, columbium, tantalum, chromium, molybdenum, tungsten, or uranium. Any compound of these heavier metals may be used, including inorganic compounds such as the halides, oxyhalides, oxides, and hydroxides, and organic compounds such as alcoholates, carboxylates, acetyl acetonates, and the like. Since the catalyst is usually prepared by admixing the starting ingredients in an inert organic diluent liquid medium, it is preferable that the heavier metal compound be one that is soluble in that diluent liquid, such as a group IV–B metal halide, e.g. titanium chloride. Instead of trialkyl aluminum compounds there can be used organo-aluminum compounds of the general formulae $RAlX_2$ and $R_2AlX$ wherein the symbol Al represents aluminum, the symbol R represents hydrogen or a hydrocarbon radical, and the symbol X represents any other substituent, including hydrogen, hydrocarbon radicals, oxyhydrocarbon radicals, and halogen atoms. Particularly active catalysts can be prepared, for example, by admixing a zirconium titanium compound, e.g. zirconium acetyl acetonate or titanium tetrachloride, and a trialkyl aluminum compound, such as triisobutyl aluminum or trioctyl aluminum, or an organo-aluminum compound such as diethyl aluminum bromide or diisobutyl aluminum hydride. In general, the organo-aluminum compound is employed in mole quantities of from 0.1 to 3 or more times the valence of the group IV, V, or VI metal compound, e.g. from 0.4 to 12 mole-weights of triisobutyl aluminum per mole-weight of titanium tetrachloride, although larger or smaller proportions can be employed. When the heavier metal compound is a metal acetyl acetonate, the organo-aluminum compound is preferably used in larger proportion, e.g. up to 24 mole-weights or more of triisobutyl aluminum per mole-weight of zirconium acetyl acetonate. Instead of organo-aluminum compounds there may be employed other organo-metal materials such as zinc alkyls, magnesium alkyls and the like.

It is not known precisely what the catalyst structure is. It is known that a chemical reaction occurs on admixing the moieties, e.g. the trialkyl aluminum compound and the heavy metal compound; heat is evolved, a change of color occurs, and a precipitate sometimes forms. It is also known that the resulting composition is catalytically different from either starting ingredient alone. It has been proposed that the catalytic entity is a lower valence compound or organic complex of the heavier metal. Herein, the term "complex organo-metal catalyst" or, more simply, "catalyst" will be employed as meaning the catalytically active composition, whatever its structure, of a kind prepared in the manner hereinbefore described.

In practicing this prior method, a polymerizable organic compound such as a normally gaseous alpha-olefin, e.g. ethylene, is contacted with a complex organo-metal catalyst, usually while having the catalyst dispersed in an inert liquid diluent as medium for the polymerization. Usually the liquid diluent is not a solvent for the polymer product and the latter precipitates from the reaction medium forming a slurry therein of solid particles. The rate of polymerization decreases as polymer accumulates in the reaction mixture, and usually becomes impractically slow after about 100 parts or less of polymer has been formed per part by weight of catalyst initially present in the reaction mixture. (Herein the term "parts by weight" of the catalyst refers to the total weight of the active chemical ingredients admixed to form the catalytically active composition. For example, the composition resulting from admixing one part by weight of triisobutyl aluminum and one part by weight of titanium tetrachloride is referred to as two parts by weight of cataylst. The weight of a chemically inactive liquid diluent in which the catalytically active admixture may be prepared is not reckoned in the weight of the catalyst.) Another way of expressing the catalyst requirements for this prior process is that practical operation usually requires at least one percent catalyst by weight, based on the polymer, i.e. at least one part by weight of catalyst is needed to produce 100 parts by weight of polymer.

The polymer product that is obtained directly from such process comprises a substantial proportion of the catalyst materials, probably by mechanical engulfment. In order to decrease the metal content of the polymeric product, it is necessary to extract the product with an extractant capable of solubilizing the catalyst residues without solubilizing the polymer. For this purpose, the polymer product is usually washed with water, or an alcohol, with or without the addition of chemical reactants such as acids or ammonia or of surface active agents. However, even exhaustive extraction does not completely remove the metal compound residues from the polymer, and the washing is usually discontinued when the proportion of metal compound residue is reduced to a non-objectionable level.

In view of the foregoing, it is desirable to devise modification of the process described, in order that less catalyst is required, i.e., so that more polymer is produced per unit weight of catalyst, and so that the resulting polymer product contains a smaller proportion of catalyst residue than has been characteristic of the prior practice of the process.

An object of the present invention is to provide an improved method for the polymerization of polymerizable organic compounds, especially normally gaseous alpha-olefins such as ethylene, in contact with the hereinbefore described complex organo-metal catalysts.

A more specific object is to provide in such a method an improvement whereby the proportion by weight of polymer produced is increased relative to the weight of catalyst necessary thereto.

Another object is to provide in such a method an improvement whereby the proportion by weight of catalyst residue material is substantially reduced relative to the weight of polymer product as directly obtained thereby.

Further objects and advantages of the method will be apparent in the following description.

The objects of this invention have been attained in an improved method for polymerization of polymerizable organic compounds, especially normally gaseous alpha-olefins such as ethylene, in contact with the hereinbefore described complex organo-metal catalysts, in which method the polymerization is carried out at relatively high temperatures of at least 175° C., but below the temperature of thermal decomposition of the organic materials, preferably between 200° and 300° C., and at relatively high pressures of at least about 500 atmospheres, preferably from 1000 to 2000 or more atmospheres. It has now been discovered that the polymerization, e.g. of ethylene, can advantageously be carried out under such conditions with a feed mixture comprising only a small fraction as much catalyst as is required for practical results at the conventional lower temperatures and pressures. Excellent results in the polymerization of ethylene have been obtained using from 75 to 125 parts per million by weight of catalyst in the ethylene feed stream. The proportion of polymer product relative to the catalyst employed is correspondingly increased greatly, e.g. to about 1000 parts or more by weight of polyethylene per part by weight of catalyst employed. Expressed differently, the present improved process can be carried out, for the production of 100 parts by weight of polyethylene, with only 0.1 or less part by weight of catalyst in contrast to at least one part of catalyst that is required for production of 100 parts of polymer by the conventional low-temperature, low-pressure process.

Not only does the present process result in economic saving of catalyst in the production of polymer, but the polymer product contains very much less catalyst residue than does the product of the conventional process. In fact, the polymer product, directly from the present polymerization process and without extraction treatment, usually contains less catalyst residue than does the polymer product of the conventional process after extensive extraction treatment.

In carrying out the present improved process for the polymerization of a normally gaseous alpha-olefin, a gas stream comprising the olefin, e.g. ethylene, is compressed and passed into a reaction zone at a pressure of at least 500 atmospheres, preferably from 1000 to 2000 or more atmospheres, and heated to a temperature of at least 175° C., preferably between 200° and 300° C. A convenient reaction zone is a small diameter tube, usually jacketed with a fluid heat-transfer medium. Into the reaction zone is also injected one of the complex organo-metal catalysts hereinbefore described. Usually the catalyst is prepared by admixing the requisite progenitors in an inert liquid medium, for example, an aliphatic or cycloaliphatic hydrocarbon such as pentane, hexane, cyclohexane, tetrahydronaphthalene, decahydronaphthalene, petroleum spirits, or mineral oil; or an aromatic hydrocarbon such as benzene, toluene, or xylene; or a halogenated aromatic hydrocarbon such as chlorobenzene, or o-dichlorobenzene; or an ether such as dioxane or tetrahydrofuran. The catalyst, or catalyst dispersion in an inert liquid medium, is fed into the reaction zone at a rate equivalent to at least about 25, e.g. between 25 and 500, preferably between 75 and 250, parts per million by weight of catalyst based on the polymerizable olefin, e.g. ethylene, although larger or smaller proportions of catalyst can be employed.

In view of the opinion hitherto widely held that the complex organo-metal catalysts herein employed are unstable at high temperatures, i.e., at temperatures appreciably above 100° C., it is surprising that these compositions are catalytically active under the conditions employed in the present process. It is even more surprising that far smaller proportions of such catalysts are required than are required at conventional lower temperatures at which the catalysts are believed to be more stable. It is further surprising that the amount of polymer formed per unit weight of catalyst is many times, e.g. ten times, greater at the present higher temperatures than at the conventional lower temperatures in spite of the lower concentration of catalyst in the present process.

From the reaction zone, e.g. from the reactor tube, there is withdrawn a mixture of polymer, catalyst, and unreacted olefin, e.g. a mixture of polyethylene, catalyst, and unreacted ethylene. The unreacted olefin, e.g. ethylene, is vented in the usual way from the non-volatile product. The polymeric product contains only a small amount, e.g. 0.1 or less percent by weight, of the complex organo-metal catalyst. The product can be treated, if desired, e.g. by extraction with water or the like, further to decrease the proportion of catalyst residue in the polymer product, although the proportion of catalyst residue, without further treatment, is usually less than that obtained by the conventional process after extensive extraction treatment.

The steps of the present improved process are preferably carried out in continuous manner, i.e. by continuously feeding to a reaction zone streams of the polymerizable alpha-olefin and of the catalyst composition, and continuously withdrawing from the reaction zone a stream of the resulting reaction mixture comprising the polymeric product.

In manner already known, the product of the present process can be molded or otherwise converted into useful articles.

The following examples illustrate the invention but should not be construed as limiting its scope. In the examples, parts and percentages are by weight, unless otherwise noted.

*Example 1*

A complex organo-metal catalyst was prepared by admixing equimolar proportions of triisobutyl aluminum and titanium tetrachloride in mineral oil as an inert liquid vehicle, the resulting composition containing approximately 90 percent by weight of mineral oil and correspondingly a total of about 10 percent of metal compounds.

Into one end of a high pressure tubular polymerization reactor were fed a stream of pure ethylene gas at a pressure of approximately 16,000 p.s.i.g. and a stream of the catalyst-oil composition. The ethylene gas was fed at an average rate of 350 pounds per hour, and the catalyst composition was fed at an average rate of about 100 parts by weight of catalyst per million parts by weight of ethylene. The mixture in the reactor tube was heated to a temperature of approximately 200° C. for an average residence time of 477 seconds. The fluid product emerging from the reactor tube was depressured, whereby unreacted ethylene was separated from the polymer product. The properties of a sample of the polymeric product so obtained were found to be as follows:

Softening point (ball and ring) _____°C__ 131.5
Density, grams per ml. at 25° C. _____ 0.9468
Molecular weight by intrinsic viscosity _____ 60,000
Melt Index _____ 1.08
Metal content by spectrographic analysis:
    Aluminum _____p.p.m__ 85
    Titanium _____p.p.m__ 63

In contrast to these results, when ethylene is polymerized at temperatures below 100° C. and at pressures up to about 1500 p.s.i., the required ratio of catalyst to ethylene is usually in the order of 1 part per 100, and the polymer product that is thereby obtained has a total metal content in the order of 3000 to 5000 p.p.m. Even after thorough extraction with water, such product usually has residual metals in the order of 200 to 1000 or more p.p.m.

*Example 2*

A complex organo-metal catalyst was prepared by admixing equimolar proportions of triisobutyl aluminum and titanium tetrachloride in mineral oil as an inert liquid vehicle, the resulting composition containing approximately 97 percent by weight of mineral oil and a total of 3 percent of metal compounds.

Into one end of a high pressure tubular polymerization reactor were fed a stream of pure ethylene gas at a pressure of approximately 23,000 p.s.i.g. and a stream of the catalyst-oil composition. The ethylene gas was fed at an average rate of 326 pounds per hour, and the catalyst composition was fed at an average rate of about 125 parts of catalyst per million parts of ethylene. The mixture in the reactor tube was heated to temperatures between 230° and 250° C. for an average residence time of 462 seconds. The fluid product emerging from the reactor tube was depressured, whereby unreacted ethylene was separated from the polymer product. The properties of a sample of the polymeric product so obtained were found to be as follows:

| | |
|---|---|
| Softening point (ball and ring) ° C | 130.0 |
| Density, grams per ml. at 25° C. | 0.9342 |
| Molecular weight by intrinsic viscosity | 51,000 |
| Melt index | 0.28 |
| Metal content, by spectrographic analysis: | |
| Aluminum p.p.m. | 100 |
| Titanium p.p.m. | 100 |

*Example 3*

A complex organo-metal catalyst was prepared by admixing 1.05 mole-weights of triisobutyl aluminum and 1.0 mole-weight of titanium tetrachloride in mineral oil as an inert liquid vehicle, the resulting composition containing approximately 95 percent by weight of the mineral oil and correspondingly a total of 5 percent of metal compounds.

Into one end of a high pressure tubular reactor were fed a stream of pure ethylene gas at a pressure of approximately 19,000 p.s.i.g. and a stream of the catalyst oil composition. The ethylene gas was fed at an average rate of 292 lbs. per hour and the catalyst composition was fed at an average rate of about 200 parts of catalyst per million parts of ethylene. The mixture in the reaction tube was heated to temperatures between 240° and 250° C. for an average residence time of 535 seconds. The fluid product emerging from the reactor tube was depressured, whereby unreacted ethylene was separated from the polymeric product. The properties of a sample of the polymeric product so obtained were found to be as follows

| | |
|---|---|
| Softening point (ball and ring) ° C | 130.0 |
| Density, grams per ml. at 25° C. | 0.949 |
| Molecular weight by intrinsic viscosity | 44,000 |
| Melt index | 1.4 |
| Metal content, by spectrographic analysis: | |
| Aluminum p.p.m. | 60 |
| Titanium p.p.m. | 80 |

In place of ethylene, there can be employed another polymerizable alpha-olefin or mixture thereof, such as propylene, butene-1, isobutylene, butadiene, isoprene and the like. In place of the catalyst composition engendered by admixing triisobutyl aluminum and titanium tetrachloride, there can be used another of the complex organo-metal catalyst compositions hereinbefore described.

We claim:

1. A method for the preparation of a high molecular weight polyethylene, which method comprises feeding, to a polymerization reaction zone, a stream of ethylene-containing gas and a catalyst composition, the catalyst composition comprising a liquid dispersion of the product of admixing in an inert liquid diluent from 0.4 to 12 mole-weights of an organo-aluminum compound and one mole-weight of a compound of a metal of group IV–B of the periodic system, the rate of feed of the catalyst corresponding to between 25 and 500 parts by weight per million parts of the ethylene-containing gas feed, maintaining the resulting mixture in the polymerization reaction zone at temperatures between 175° and 300° C. and at pressures of at least 500 atmospheres, withdrawing at least a portion of the reaction mixture from the reaction zone, and separating from the withdrawn portion a high molecular weight polyethylene product.

2. A method according to claim 1 wherein the organo-aluminum compound is a trialkyl aluminum compound.

3. A method according to claim 1 wherein the compound of a metal of group IV–B of the periodic system is a compound of titanium.

4. A method according to claim 1 wherein the compound of a metal of group IV–B of the periodic system is a halide of titanium.

5. A method according to claim 1 wherein the compound of a metal of group IV–B of the periodic system is titanium tetrachloride.

6. A method for the preparation of a high molecular weight polyethylene, which method comprises feeding, to a polymerization reaction zone, a stream of ethylene and a catalyst composition, the catalyst composition comprising a liquid dispersion of the product of admixing in an inert diluent from 0.4 to 12 mole-weights of a trialkalyl aluminum compound and one mole-weight of a titanium compound, the rate of feed of the catalyst corresponding to between 75 and 250 parts by weight per million parts of the ethylene feed, maintaining the resulting mixture in the polymerization reaction zone at temperatures between 200° and 300° C. and at pressures of at least 1000 atmospheres, withdrawing at least a portion of the reaction mixture from the reaction zone, and separating from the withdrawn portion a high molecular weight polyethylene product.

7. A method according to claim 6 wherein the trialkyl aluminum compound is triisobutyl aluminum and the titanium compound is titanium tetrachloride.

8. A method which comprises polymerizing a polymerizable alpha-olefin having from 2 to 4 carbon atoms by contacting the same with between 25 and 500 parts by weight of a complex organo-metal catalyst per million parts of said alpha-olefin to obtain a high molecular weight polymerized alpha-olefin, wherein the complex organo-metal catalyst is obtained by interacting in an inert liquid diluent from 0.4 to 12 mole-weights of an organo-metallic compound selected from the class consisting of organo-aluminum, organo-zinc and organo-magnesium compounds and a one mole-weight of a metal compound selected from the class consisting of compounds of the metals of groups IV–B, V–B and VI–B of the periodic system, particularly characterized by carrying out the polymerizing at a temperature between 175° and 300° C. and at a pressure of at least 500 atmospheres.

9. A method according to claim 8 wherein the organo-metallic compound is an organo-aluminum compound.

10. A method according to claim 9 wherein the organo-aluminum compound is a trialkylaluminum compound.

11. A method according to claim 8 wherein the metal compound is a compound of a metal of group IV–B of the periodic system.

12. A method according to claim 11 wherein the metal compound is a compound of titanium.

13. A method according to claim 11 wherein the metal compound is a halide of titanium.

14. A method according to claim 11 wherein the metal compound is titanium tetrachloride.

15. A method according to claim 8 wherein the alpha-olefin is ethylene.

References Cited in the file of this patent

UNITED STATES PATENTS

| | | |
|---|---|---|
| 2,567,109 | Howard | Sept. 4, 1951 |
| 2,721,189 | Anderson | Oct. 18, 1955 |

FOREIGN PATENTS

| | | |
|---|---|---|
| 533,362 | Belgium | May 16, 1955 |